United States Patent
Kim et al.

(10) Patent No.: US 11,425,487 B2
(45) Date of Patent: Aug. 23, 2022

(54) TRANSLATION SYSTEM USING SOUND VIBRATION MICROPHONE

(71) Applicant: EM-TECH Co., Ltd., Gyeongsangnam-do (KR)

(72) Inventors: Cheon Myeong Kim, Gyeongsangnam-do (KR); Byung Min Yu, Seoul (KR); Jae Hwa Lim, Gyeongsangnam-do (KR); Jeong Ae Ha, Gyeongsangnam-do (KR); Ji Young Lee, Gyeongsangnam-do (KR)

(73) Assignee: EM-TECH CO., LTD., Gyeongsangnam-Do (KR)

( * ) Notice: Subject to any disclaimer, the term of this patent is extended or adjusted under 35 U.S.C. 154(b) by 115 days.

(21) Appl. No.: 17/101,422

(22) Filed: Nov. 23, 2020

(65) Prior Publication Data
US 2021/0168492 A1    Jun. 3, 2021

(30) Foreign Application Priority Data

Nov. 29, 2019    (KR) ........................ 10-2019-0157186
May 14, 2020    (KR) ........................ 10-2020-0057766

(51) Int. Cl.
*H04R 1/10*    (2006.01)
*H04R 17/02*    (2006.01)
(Continued)

(52) U.S. Cl.
CPC .......... *H04R 1/1091* (2013.01); *G06F 40/58* (2020.01); *G10L 15/22* (2013.01); *H04R 1/04* (2013.01); *H04R 1/1041* (2013.01); *H04R 1/1075* (2013.01); *H04R 17/02* (2013.01); *H04R 2410/03* (2013.01); *H04R 2420/07* (2013.01)

(58) Field of Classification Search
CPC ...... H04R 1/1091; H04R 1/04; H04R 1/1041; H04R 1/1075; G06F 40/58; G10L 15/22
See application file for complete search history.

(56) References Cited

U.S. PATENT DOCUMENTS

| 7,518,289 B2 | 4/2009 | Kobayashi et al. |
| 7,876,024 B2 | 1/2011 | Melz et al. |

(Continued)

FOREIGN PATENT DOCUMENTS

| JP | 2011129971 A | 6/2011 |
| JP | 2019175426 A | 10/2019 |

(Continued)

*Primary Examiner* — Simon King
(74) *Attorney, Agent, or Firm* — Murphy, Bilak & Homiller, PLLC (57) ABSTRACT

Disclosed is a translation system using a sound vibration microphone capable of fundamentally blocking noise by detecting vibrations generated from a user's voice using a piezo element. The translation system using a sound vibration microphone includes a first earset including a sound vibration sensor and a speaker, a first wearable acoustic device including a microphone and a speaker and performing wireless communication with the first earset, and a first electronic communication device performing wireless communication with the first wearable acoustic device and performing communication with a translation server, wherein the first wearable acoustic device and the first electronic communication device are in a communicatable state.

10 Claims, 5 Drawing Sheets

(51) Int. Cl.
G06F 40/58 (2020.01)
H04R 1/04 (2006.01)
G10L 15/22 (2006.01)

(56) References Cited

U.S. PATENT DOCUMENTS

| | | | | |
|---|---|---|---|---|
| 8,527,258 B2* | 9/2013 | Kim et al. | ............... | G10L 15/26 704/235 |
| 2009/0234635 A1* | 9/2009 | Bhatt | ................... | G06F 40/58 704/235 |
| 2015/0058023 A1* | 2/2015 | Goo | ................... | G10L 15/005 704/277 |
| 2015/0105117 A1* | 4/2015 | Larson | ................ | H04M 1/6066 455/518 |
| 2016/0267187 A1* | 9/2016 | Gabara | .................... | G06F 3/167 |
| 2018/0048750 A1* | 2/2018 | Hardi | .................... | H04L 65/612 |
| 2018/0260388 A1* | 9/2018 | Huang | ................... | G06F 40/58 |
| 2018/0322116 A1* | 11/2018 | Huang | ................. | H04L 67/565 |
| 2018/0329896 A1* | 11/2018 | Goethals | ................. | G10L 13/00 |
| 2019/0279618 A1* | 9/2019 | Yadav | .................... | G06F 40/30 |
| 2021/0377642 A1* | 12/2021 | Luo | ..................... | H04R 1/041 |

FOREIGN PATENT DOCUMENTS

| | | |
|---|---|---|
| KR | 20100102480 A | 9/2010 |
| KR | 101332006 B1 | 11/2013 |
| KR | 101524579 B1 | 6/2015 |
| KR | 20150081157 A | 7/2015 |
| KR | 101693268 B1 | 1/2017 |
| KR | 101834546 B1 | 4/2018 |

\* cited by examiner

TRANSLATION SYSTEM USING SOUND VIBRATION MICROPHONE

TECHNICAL FIELD

The present disclosure relates to a translation system, and in particular, to a translation system using a sound vibration microphone capable of fundamentally blocking noise by detecting vibrations generated from a user's voice using a piezoelectric element.

BACKGROUND

Recently, the number of foreign visitors to Korea and the number of Koreans visiting abroad have been steadily growing over the years. In particular, as transactions with China have been made in the overall industry, the number of Chinese visitors to Korea has rapidly increased. In addition, it is easy to predict that many people from all over the world, including Japan, will visit Korea. Also, the number of people visiting Korea for business purposes is on the rise. Therefore, communication between numerous visitors from all over the world and communication between Korean people has emerged as being very important.

These foreign visitors and overseas travelers generally use hotels with complete services. In general, in hotels, when a visitor wants to communicate using his/her own language or when a visitor wants to communicate with a person who uses a language of a sprachraum different from that of the visitor, the visitor may communicate through a translator who resides in the hotel or may use an e-mail using the Internet, a facsimile, or the like. In addition, it is practically difficult to arrange all translators who can speak languages of all countries of the world, a translator must be accompanied at all times, it is unreasonable that one or two translators cannot provide satisfactory services to large numbers of visitors, and the translation service is not provided at a desired time.

Therefore, in the related art, development of a technology for simultaneous translation in real time when visitors talks with foreigners using a communication terminal that they carry around during tourism is required.

SUMMARY

Therefore, an object of the present disclosure is to provide a translation system using a sound vibration microphone capable of fundamentally blocking noise by detecting vibrations generated from a user's voice using a piezoelectric element.

According to an aspect of the present disclosure, there is provided a translation system using a sound vibration microphone including: a first earset including a sound vibration sensor and a speaker; a first wearable acoustic device including a microphone and a speaker and performing wireless communication with the first earset; and a first electronic communication device performing wireless communication with the first wearable acoustic device and performing communication with a translation server, wherein the first wearable acoustic device and the first electronic communication device are in a communicatable state, the first wearable acoustic device transmits a first sound signal from the first earset to an electronic communication device, the electronic communication device transmits the first sound signal to a translation server, receives a first translation signal corresponding to the first sound signal from the translation server, and transmits the first translation signal to the first wearable acoustic device, and the first wearable acoustic device emits the first translation signal as a sound through the speaker thereof, the first wearable acoustic device transmits a second sound signal from the microphone thereof to the electronic communication device, the electronic communication device transmits the second sound signal to the translation server, receives a second translation signal corresponding to the second sound signal from the translation server, and transmits the second translation signal to the first wearable acoustic device, the first wearable acoustic device transmits the second translation signal to the first earset, and the first earset emits the second translation signal as a sound through the speaker thereof.

According to another aspect of the present disclosure, there is provided a translation system using a sound vibration microphone including: a first earset including a sound vibration sensor and a speaker; and a first wearable acoustic device including a microphone and a speaker and performing wireless communication with the first earset, wherein the first wearable acoustic device transmits a first sound signal from the first earset to a translation server, receives a first translation signal corresponding to the first sound signal from the translation server, and emits the first translation signal as a sound through the speaker thereof, and the first wearable acoustic device transmits a second sound signal from the microphone thereof to the translation server, receives a second translation signal corresponding to the second sound signal from the translation server, and transmits the second translation signal to the first earset, and the first earset emits the second translation signal through the speaker thereof.

According to another aspect of the present disclosure, there is provided a translation system using a sound vibration microphone including: a first earset including a sound vibration sensor and a speaker; a first wearable acoustic device including a microphone and a speaker and performing wireless communication with the first earset; and a first electronic communication device including a microphone and a speaker, performing wireless communication with the first wearable acoustic device, and performing communication with a translation server, wherein the first wearable acoustic device and the first electronic communication device are in a communicatable state, the first wearable acoustic device transmits a first sound signal from the first earset to an electronic communication device, the electronic communication device transmits the first sound signal to a translation server, receives a first translation signal corresponding to the first sound signal from the translation server, and emits the first translation signal as a sound through the speaker thereof, and the electronic communication device transmits a second sound signal from the microphone thereof to the translation server, receives a second translation signal corresponding to the second sound signal from the translation server, and transmits the second translation signal to the first wearable acoustic device, and the first wearable acoustic device transmits the second translation signal to the first earset, and the first earset emits the second translation signal as a sound through the speaker thereof.

In addition, the sound vibration sensor may include a housing forming an exterior, a piezoelectric element installed in the housing and having a cantilever structure, a support structure supporting a fixed end of the piezoelectric element, a weight attached to a free end of the piezoelectric element, and a conduction part transferring an output from the piezoelectric element, wherein a fixed portion of the piezoelectric element fixed by the support structure is 40% or less of a total volume, a thickness of the piezoelectric element is 0.3 mm or greater, a weight of the weight is 5 mg or greater, and the weight may be formed of metals having a density of 5 or greater.

According to the present disclosure, a translation system using a sound vibration microphone capable of fundamentally blocking noise by detecting vibrations generated from a user's voice using a piezoelectric element is provided.

The piezo-sound vibration microphone having a cantilever structure provided by the present disclosure detects vibrations generated from a speaker's voice using a piezoelectric element, and thus ambient noise may be advantageously fundamentally blocked.

In addition, since the piezoelectric element of the piezo-sound vibration microphone having a cantilever structure provided by the present disclosure has a cantilever structure, and thus the piezo-sound vibration microphone has excellent vibration detection capability.

Those skilled in the art will recognize additional features and advantages upon reading the following detailed description, and upon viewing the accompanying drawings.

DETAILED DESCRIPTION

Hereinafter, various embodiments of the disclosure will be described in detail with reference to the accompanying drawings. Embodiments and terms used herein are not intended to limit the technologies described in the present disclosure to specific embodiments, and it should be understood that the embodiments and the terms include modifications, equivalents, and/or alternatives on the corresponding embodiments described herein. With regard to description of drawings, similar components may be marked by similar reference numerals.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various example embodiments of the disclosure may modify various components regardless of their order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or another element (e.g., third element) may be interposed between them. It may be understood that when an element (e.g., first element) is referred to as being "directly connected," or "directly coupled" to another element (second element), there may be no element (e.g., third element) interposed between them.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that can perform the corresponding operations by executing one or more software programs stored in a memory device.

The terms used herein are merely for the purpose of describing example embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Figure 1:
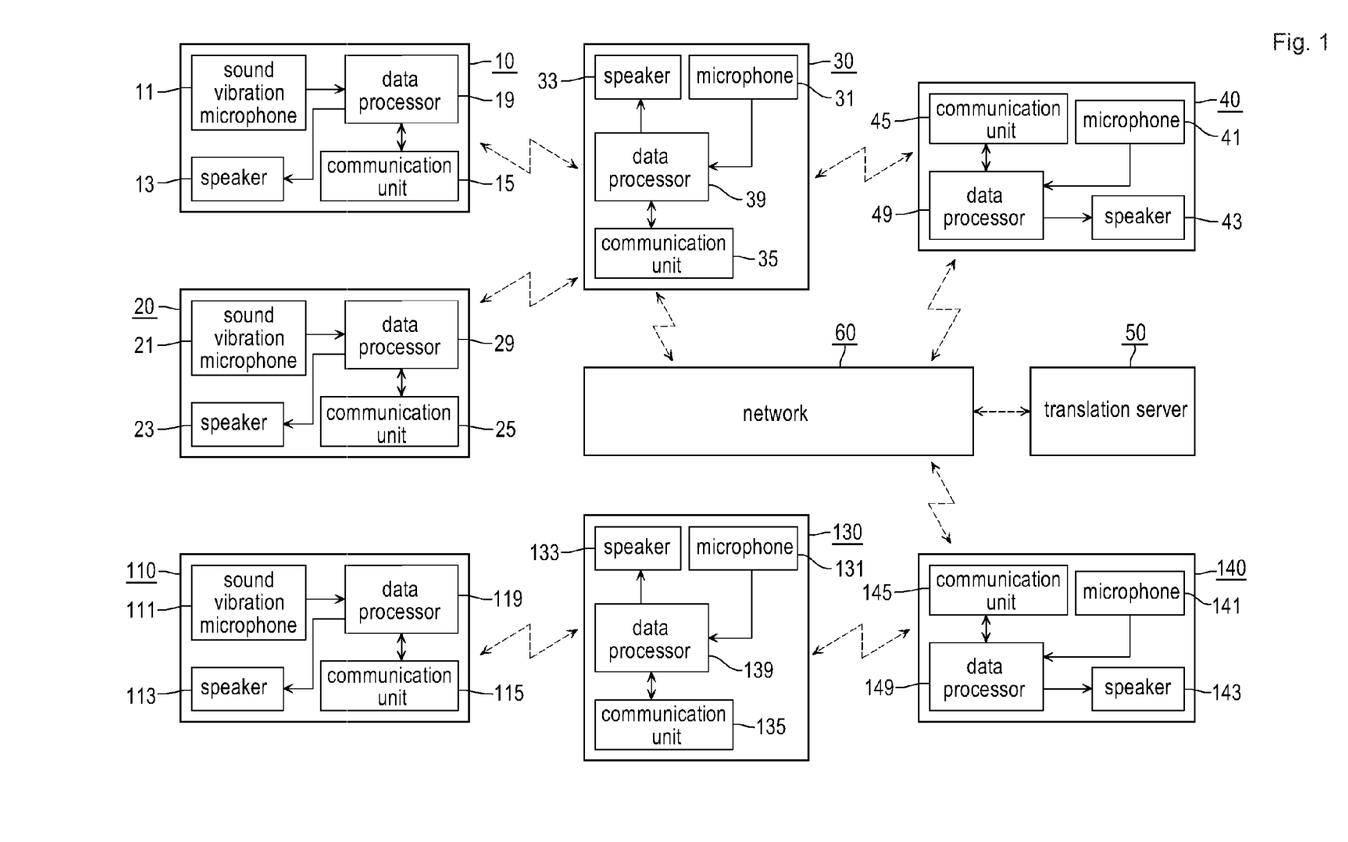
FIG. 1 is a block diagram of a translation system using a sound vibration microphone according to the present disclosure.

FIG. 1 is a block diagram of a translation system using a sound vibration microphone according to the present disclosure.

The translation system includes first and second wireless earsets 10 and 20 each performing communication with a wearable acoustic device 30, the wearable acoustic device 30 independently performing communication with each of the first and/or second wireless earsets 10 and 20, an electronic communication device 40, and a translation sever 50, an electronic communication device 40 performing communication with each of the wearable acoustic device 30 and the translation server 50, the translation server 50 independently performing communication with each of the electronic communication device 40 and/or the wearable acoustic device 30 and/or the electronic communication device 140 through a network 60, receiving translation subject information, translating a sound included in a sound signal included in the translation subject information into text, and providing translation information including a sound signal converted from the text, a third wireless earset 110 performing communication with the wearable acoustic device 30, a wearable acoustic device 130 independently performing communication with the third wireless earset and the electronic communication device 140, and the electronic communication device 140 performing communication with each of the wearable acoustic device 130 and the translation server 50.

The network 60 corresponds to a system for performing wired communication and/or wireless communication, and since the network 60 corresponds to a technology that is naturally recognized by a person skilled in the art to which the present disclosure pertains, a detailed description thereof is omitted.

The first wireless earset 10 includes a sound vibration microphone 11 that obtains a user's voice and applies a sound signal to a data processor 19, a speaker 13 that receives an electrical signal from the data processor 19 and emits sound, a communication module 15 (e.g., a wireless communication module such as a Bluetooth module) that performs wireless communication with the wearable acoustic device 30, and the data processor 19 that performs wireless communication with the wearable acoustic device 30 through the communication unit 15, transmits a sound signal from the sound vibration microphone 11 to the wearable acoustic device 30 through the communication unit 15 when performing a translation function, and receives a sound signal which is an electrical signal applied from the wearable acoustic device 30 through the communication unit 15 and applies the received sound signal to the speaker 13. However, a configuration and function of a power supply unit (not shown), the microphone 11, the speaker 13, and the communication unit 15 for supplying power correspond to technologies that are naturally recognized by those skilled in the art to which the present disclosure pertains, and thus a description thereof will be omitted. A mechanical structure of the first earset 10 will be described in detail with reference to FIGS. 2 to 10. In addition, as already widely known, the data processor 19 performs a phone call function and a sound reproduction function, and a process of performing a translation function according to the present disclosure will be described below.

The second wireless earset 20 has the same configuration as that of the first wireless earset 10 described above and includes a sound vibration microphone 21, a speaker 23, a communication unit 25, and a data processor 29.

Each of the first and second wireless earsets 20 may communicate with each other as a master device and a slave device.

The wearable acoustic device 30 is a device including a wireless communication function, such as a neckband type sound conversion device, and performing a phone call function, a sound reproduction function, and the like. The wearable acoustic device 30 includes a microphone 31 acquiring external sound, a speaker 33 emitting sound upon receiving an electric signal, a communication unit 35 performing wireless communication (e.g., Bluetooth communication, etc.) and/or wired communication with each of the first and/or second earsets 10 and 20, the communication device 40, and the translation server 50, and a data processor 39 selectively performing a sound reproduction function and a translation function by controlling the microphone 31, the speaker 33, and the communication unit 35. However, the configuration or function of the power supply unit (not shown) for supplying power, the microphone 31, the speaker 33, and the communication unit 35 correspond to technologies naturally recognized by a person skilled in the art to which the present disclosure pertains, and thus a description thereof is omitted.

The data processor 39 performs a phone call function and a sound reproduction function as already known by a person skilled in the art to which the present invention pertains and includes a processor (e.g., CPU, MCU, microprocessor, etc.) that performs a translation function according to the present disclosure and a storage space (e.g., memory, etc.) that stores a sound signal or the like. As widely known, the data processor 39 performs a phone call function and a sound reproduction function, and a process of performing a translation function according to the present disclosure is described below.

The electronic communication device 40 corresponds to, for example, an information communication device such as a smartphone or a tablet having a communication function and includes a microphone 41 that acquires a sound, a speaker 43, a communication unit 45 that performs wireless communication (e.g., Bluetooth communication, etc.) with the wearable acoustic device 30 and performs communication with a translation server 50 through the network 60, and a data processor 49 that performs a phone call function and a sound reproduction function and performs a translation function according to the present disclosure. However, the configuration or function of a power supply unit (not shown) that supplies power, the microphone 41, the speaker 43 and the communication unit 45 correspond to technologies naturally recognized by those skilled in the art to which the present disclosure pertains, so a description thereof is omitted.

The data processor 49 includes a processor (e.g., CPU, MCU, microprocessor, etc.) that performs a phone call function, a sound reproduction function, and a translation function and a storage space (e.g., memory, etc.) that stores an application for a translation function, a user interface, and translation information. The data processor 49 performs an application for a translation function and will be described in detail through various embodiments below.

The translation server 50 has a speech to text (STT) function (a function of extracting sound information included in translation target information and recognizing and converting extracted sound information to text), a function of translating a text to generate a translated text, and/or a text to speech (TTS) function (a function for synthesizing text to speech). Such a translation server 50 corresponds to a technology naturally recognized by a person skilled in the art to which the present disclosure pertains, and thus a detailed description thereof is omitted.

The third wireless earset 110 has the configuration of the first and second wireless earsets 10 and 20 described above, and communicates with the wearable acoustic device 130.

The wearable acoustic device 130 has the same configuration as the wearable acoustic device 30 described above and communicates with each of the third wireless earset 110 and the electronic communication device 140.

The electronic communication device 140 has the same configuration as the electronic communication device 40 described above, communicates with the wearable acoustic device 30 and communicates with the translation server 50 through the network 60.

The electronic communication device 40 and the electronic communication device 140 may perform data communication with each other such as short-range communication or the like, without passing through the network 60.

In the present disclosure, a translation subject language corresponds to a language that needs to be translated or interpreted into a language spoken by the user, and the translation target language corresponds to a language that the language spoken by the user is finally delivered to a conversation counterpart through translation. For example, if the user who speaks Korean wants to translate in English, a translation target language is English and the translation subject language is Korean.

In the following, examples of translation functions in the translation system according to the present disclosure are described.

As a first embodiment, a control process of the translation system of FIG. 1 is described. The data processor 49 performs a first setting process of setting an application for a translation function to set a translation subject language and a translation target language and a second translation process of operating the wearable acoustic device 30 and the first wireless earset 10 in a translation function mode.

First, in the first setting process, the data processor 49 operates an application for a translation function, displays a user interface for setting a translation subject language and a translation target language on a display unit (not shown), and sets a translation subject language and a translation target language input from an input unit (not shown) according to a user selection.

Next, in the second translation process, the data processor 49 applies a start command of a translation function mode through the communication unit 45 to the wearable acoustic device 30 to acquire, as a sound signal (first sound signal), a user's voice from the sound vibration microphone 11 of the first wireless earset 10 that the user inserts into or wears in his/her ear and to acquire, as a sound signal (second sound signal), a voice of a counterpart of the conversation with the user from the microphone 30 of the wearable acoustic device 30 that the user wears on his/her neck or shoulder. Accordingly, the data processor 39 starts the translation function mode according to the start command of the translation function mode and transmits the start command of the translation function mode to the first wireless earset 10 through the communication unit 35. In addition, the data processor 19 starts the translation function mode upon receiving the start command of the translation function mode through the communication unit 15.

In the first embodiment, a user's voice translation path includes a sound signal transmission path in which the data processor acquires a first sound signal from the sound vibration microphone 11 of the first wireless earset 10 and transmits the first sound signal to the wearable acoustic device 30 through the communication unit 15, the data processor 39 receives the first sound signal through the communication unit 35 and transmits the first sound signal to the electronic communication device 40 through the communication unit 35, and the data processor 49 receives the first sound signal through the communication unit 45 and transmits translation subject information (including first sound signal, translation subject language, a translation target language, etc.) to the translation server 50 through the network 60 by controlling the communication unit 45. In addition, the user's voice translation path includes a translation signal transmission path in which the translation server 50 transmits a first translation signal, which is a sound signal obtained by translating the first sound signal in the translation subject information to a translation target language, to the electronic communication device 40 through the network 60, the data processor 49 receives the first translation signal through the communication unit 45 and transmits the first translation signal to the wearable acoustic device 30 through the communication unit 45, and the data processor 39 receives the first translation signal through the communication unit 35 and applies the first translation signal to the speaker 33 so that a conversation counterpart may hear a translated sound based on the first translation signal.

In addition, a sound translation path of the conversation counterpart includes a sound signal transmission path in which the data processor 39 transmits a second sound signal acquired from the microphone 31 to the electronic communication device 40 through the communication unit 35, and the data processor 49 receives the second sound signal through the communication unit 45 and transmits translation subject information (including second sound signal, translation subject language, a translation target language, etc.) to the translation server 50 through the network 60 by controlling the communication unit 45. The translation subject language of the second sound signal is the same as the translation target language of the first sound signal, and the translation target language of the second sound signal is the same as the translation target language of the first sound signal. In addition, the sound translation path of the conversation counterpart includes a translation signal transmission path in which the translation server 50 transmits a second translation signal, which is a sound signal obtained by translating the second sound signal in the translation subject information to a translation target language, to the electronic communication device 40 through the network 60, the data processor 49 receives the second translation signal through the communication unit 45 and transmits the second translation signal to the wearable acoustic device 30 through the communication unit 45, the data processor 39 receives the second translation signal through the communication unit 35 and transmits the second translation signal to the first wireless earset 10 through the communication unit 35, and the data processor 19 receives the second translation signal through the communication unit 15 and applies the received second translation signal to the speaker 13 so that the user may hear a translated sound based on the second translation signal.

Next, in a second embodiment, the wearable acoustic device 30 may directly communicate with the translation server 50 through the network 60 without control of the electronic communication device 40 to perform a translation function.

The data processor 39 performs a first setting process of acquiring a translation function start input from the input unit (not shown) and operating an application for a translation function to set a translation subject language and a translation target language and a second translation process of operating the first wireless earset 10 in a translation function mode.

First, in the first setting process, the data processor 39 operates an application for the translation function, and sets a translation subject language and a translation target language upon receiving the translation subject language and the translation target language from the input unit (not shown).

Next, in the second translation process, the data processor 39 transmits a start command of a translation function mode to the first wireless earset 10 through the communication unit 35 to acquire a user's voice as a sound signal (first sound signal) from the sound vibration microphone 11 of the first wireless earset 10 inserted in or worn on the user's ear and to acquire a voice of a conversation counterpart of the user as a sound signal (second sound signal) from the microphone 30 of the wearable acoustic device 30 worn on the user's neck or shoulder. In addition, the data processor 19 starts the translation function mode upon receiving a start command of the translation function mode through the communication unit 15.

In the second embodiment, a user's voice translation path includes a sound signal transmission path in which the data processor acquires a first sound signal from the sound vibration microphone 11 of the first wireless earset 10 and transmits the first sound signal to the wearable acoustic device 30 through the communication unit 15, the data processor 39 receives the first sound signal through the communication unit 35 and transmits translation subject information (including the first sound signal, a translation subject language, a translation target language, etc.) to the translation server 50 through the network 60 by controlling the communication unit 35. In addition, the user's voice translation path includes a translation signal transmission path in which the translation server 50 transmits a first translation signal, which is a sound signal obtained by translating the first sound signal in the translation subject information to a translation target language, to the wearable acoustic device 30 through the network 60 and the data processor 39 receives the first translation signal through the communication unit 35 and applies the first translation signal to the speaker 33 so that a conversation counterpart may hear a translated sound based on the first translation signal.

In addition, a sound translation path of the conversation counterpart includes a sound signal transmission path in which the data processor 39 transmits a second sound signal acquired from the microphone 31 and translation subject information (including the second sound signal, a translation subject language, a translation target language, etc.) to the translation server 50 through the network 60 by controlling the communication unit 35. The translation subject language of the second sound signal is the same as the translation target language of the first sound signal, and the translation target language of the second sound signal is the same as the translation target language of the first sound signal. In addition, the sound translation path of the conversation counterpart includes a translation signal transmission path in which the translation server 50 transmits a second translation signal, which is a sound signal obtained by translating the second sound signal in the translation subject information to a translation target language, to the wearable acoustic device 30 through the network 60, the data processor 39 receives the second translation signal through the communication unit 35 and transmits the second translation signal to the first wireless earset 10 through the communication unit 35, and the data processor 19 receives the second translation signal through the communication unit 15 and applies the received second translation signal to the speaker 13 so that the user may hear a translated sound based on the second translation signal.

Next, in a third embodiment, unlike the first embodiment, the electronic communication device 40 acquires a voice of the conversation counterpart through the built-in microphone 41 and emits, as a sound, a translation signal for the user's voice through a built-in speaker 43 In the third embodiment, it is preferable that the electronic communication device 40 is located adjacent to the conversation counterpart.

The data processor 49 performs a first setting process of setting a translation subject language and a translation target language by operating an application for a translation function and a second translation process of operating the wearable acoustic device 30 and the first wireless earset 10 in a translation function mode.

First, in the first setting process, the data processor 49 operates the application for a translation function, displays a user interface for setting a translation subject language and a translation target language on a display unit (not shown), and sets a translation subject language and a translation target language input from an input unit (not shown) according to a user selection.

Next, in the second translation process, the data processor 49 applies a start command of a translation function mode through the communication unit 45 to the wearable acoustic device 30 to acquire, as a sound signal (first sound signal), a user's voice from the sound vibration microphone 11 of the first wireless earset 10 that the user inserts into or wears in his/her ear and to acquire, as a sound signal (second sound signal), a voice of a counterpart of the conversation with the user from the built-in microphone 41. Accordingly, the data processor 39 starts the translation function mode according to the start command of the translation function mode and transmits the start command of the translation function mode to the first wireless earset 10 through the communication unit 35. In addition, the data processor 19 starts the translation function mode upon receiving the start command of the translation function mode through the communication unit 15.

In the third embodiment, a user's voice translation path includes a sound signal transmission path in which the data processor acquires a first sound signal from the sound vibration microphone 11 of the first wireless earset 10 and transmits the first sound signal to the wearable acoustic device 30 through the communication unit 15, the data processor 39 receives the first sound signal through the communication unit 35 and transmits the first sound signal to the electronic communication device 40 through the communication unit 35, and the data processor 49 receives the first sound signal through the communication unit 45 and transmits translation subject information (including first sound signal, translation subject language, a translation target language, etc.) to the translation server 50 through the network 60 by controlling the communication unit 45. In addition, the user's voice translation path includes a translation signal transmission path in which the translation server 50 transmits a first translation signal, which is a sound signal obtained by translating the first sound signal in the translation subject information to a translation target language, to the electronic communication device 40 through the network 60, the data processor 49 receives the first translation signal through the communication unit 45 and applies the first translation signal to the speaker 33 so that a conversation counterpart may hear a translated sound based on the first translation signal.

In addition, a sound translation path of the conversation counterpart includes a sound signal transmission path in which the data processor 49 transmits a second sound signal acquired from the microphone 41 and translation subject information (including the second sound signal, a translation subject language, a translation target language, etc.) to the translation server 50 through the network 60 by controlling the communication unit 45. The translation subject language of the second sound signal is the same as the translation target language of the first sound signal, and the translation target language of the second sound signal is the same as the translation target language of the first sound signal. In addition, the sound translation path of the conversation counterpart includes a translation signal transmission path in which the translation server 50 transmits a second translation signal, which is a sound signal obtained by translating the second sound signal in the translation subject information to a translation target language, to the electronic communication device 40 through the network 60, the data processor 49 receives the second translation signal through the communication unit 45 and transmits the second translation signal to the wearable acoustic device 30 through the communication unit 45, the data processor 39 receives the second translation signal through the communication unit 35 and transmits the second translation signal to the first wireless earset 10 through the communication unit 35, and the data processor 19 receives the second translation signal through the communication unit 15 and applies the received second translation signal to the speaker 13 so that the user may hear a translated sound based on the second translation signal.

Next, as a fourth embodiment, the first and second wireless earsets 10 and 20 are wirelessly connected to the wearable acoustic device 30, and the first wireless earset 10 is worn on the user's ear and the second wireless earset 20 is worn on the ear of the conversation counterpart.

The data processor 49 performs a first setting process of operating an application for a translation function to set a translation subject language and a translation target language and a second translation process of operating the wearable acoustic device 30 and the first and second wireless earsets 10 and 20 in a translation function mode.

First, in the first setting process, the data processor 49 operates an application for a translation function, displays a user interface for setting a translation subject language and a translation target language on a display unit (not shown), and sets translation subject language and a translation target language input from an input unit (not shown) according to a user selection.

Next, in the second translation process, the data processor 49 applies a start command of a translation function mode through the communication unit 45 to the wearable acoustic device 30 to acquire, as a sound signal (first sound signal), a user's voice from the sound vibration microphone 11 of the first wireless earset 10 that the user inserts into or wears in his/her ear and to acquire, as a sound signal (second sound signal), a voice of a counterpart of the conversation with the user from the sound vibration microphone 21 of the second wireless earset 20 that the conversation counterpart inserts into or wears in his/her ear. Accordingly, the data processor 39 starts the translation function mode according to the start command of the translation function mode and transmits the start command of the translation function mode to the first and second wireless earsets 10 and 20 through the communication unit 35. In addition, the data processors 19 and 29 starts the translation function mode upon receiving the start command of the translation function mode through the communication units 15 and 25, respectively.

In a fourth embodiment, a user's voice translation path includes a sound signal transmission path in which the data processor acquires a first sound signal from the sound vibration microphone 11 of the first wireless earset 10 and transmits the first sound signal to the wearable acoustic device 30 through the communication unit 15, the data processor 39 receives the first sound signal through the communication unit 35 and transmits the first sound signal to the electronic communication device 40 through the communication unit 35, and the data processor 49 receives the first sound signal through the communication unit 45 and transmits translation subject information (including first sound signal, translation subject language, a translation target language, etc.) to the translation server 50 through the network 60 by controlling the communication unit 45. In addition, the user's voice translation path includes a translation signal transmission path in which the translation server 50 transmits a first translation signal, which is a sound signal obtained by translating the first sound signal in the translation subject information to a translation target language, to the electronic communication device 40 through the network 60, the data processor 49 receives the first translation signal through the communication unit 45 and transmits the first translation signal to the wearable acoustic device 30 through the communication unit 45, the data processor 39 receives the first translation signal through the communication unit 35 and transmits the first translation signal to the second wireless earset 20, and the data processor 29 applies the first translation signal to the speaker 33 so that a conversation counterpart may hear a translated sound based on the first translation signal.

In addition, a sound translation path of the conversation counterpart includes a sound signal transmission path in which the data processor 29 acquires a second sound signal from the sound vibration microphone 21 of the first wireless earset 20 and transmits the second sound signal to the wearable acoustic device 30 through the communication unit 25, the data processor 39 receives the second sound signal through the communication unit 35 and transmits the second sound signal to the electronic communication device 40 through the communication unit 35, and the data processor 49 receives the second sound signal through the communication unit 45 and transmits translation subject information (including second sound signal, translation subject language, a translation target language, etc.) to the translation server 50 through the network 60 by controlling the communication unit 45. The translation subject language of the second sound signal is the same as the translation target language of the first sound signal, and the translation target language of the second sound signal is the same as the translation target language of the first sound signal. In addition, the sound translation path of the conversation counterpart includes a translation signal transmission path in which the translation server 50 transmits a second translation signal, which is a sound signal obtained by translating the second sound signal in the translation subject information to a translation target language, to the electronic communication device 40 through the network 60, the data processor 49 receives the second translation signal through the communication unit 45 and transmits the second translation signal to the wearable acoustic device 30 through the communication unit 45, the data processor 39 receives the second translation signal through the communication unit 35 and transmits the second translation signal to the first wireless earset 10 through the communication unit 35, and the data processor 19 receives the second translation signal through the communication unit 15 and applies the received second translation signal to the speaker 13 so that the user may hear a translated sound based on the second translation signal.

Next, as a fifth embodiment, a user translation apparatus includes the first wireless earset 10, the wearable acoustic device 30, and the electronic communication device 40, and a conversation counterpart translation apparatus includes the third wireless earset. 110, the wearable acoustic device 130 and the electronic communication device 140.

While the electronic communication device 40 and the electronic communication terminal 140 are maintained in a connected state, while performing an application for a translation function.

In the user translation apparatus, the data processor 49 transmits a first sound signal, which is the user's voice, to the translation server 50 through the network 60, and the translation server 50 transmits a first translation signal corresponding to the first sound signal to the electronic communication device 40 through the network 60. The data processor 49 transmits the first translation signal to the conversation counterpart translation apparatus through the communication unit 45. The data processor 149 of the electronic communication device 140 receives the first translation signal and allows sound to be emitted through the speaker 133 and/or 113 of the wearable acoustic device 130 and/or the third wireless earset 110.

Conversely, in the conversation counterpart's translation apparatus, the data processor 149 transmits a second sound signal, which is a voice of the conversation counterpart, to the translation server 50 through the network 60, and the translation server 50 transmits a second translation signal corresponding to the second sound signal to the electronic communication device 140 through the network 60. The data processor 149 transmits the second translation signal to the user translation apparatus through the communication unit 145. That is, the data processor 49 of the electronic communication device 40 receives the second translation signal and allows sound to be emitted through the speakers 33 and/or 13 of the wearable acoustic device 30 and/or the first wireless earset 10.

Next, as a sixth embodiment, the wearable acoustic device 30 additionally includes a sound vibration microphone. When the user wears the wearable acoustic device 30 on the body, the additionally provided sound vibration microphone directly or indirectly comes into contact with the user's skin. The wearable acoustic device 30 may perform a translation function using a sound signal from at least one of the microphone 31 and the sound vibration microphone.

Next, as a seventh embodiment, the first or second wireless earsets 10 or 20 may additionally include a general microphone in addition to the sound vibration microphone and may perform a translation function using a sound signal from any one of the microphone and the sound vibration microphone 11 and 21.

The sound vibration microphones 11, 21, and 111 in FIG. 1 are the same as the sound vibration sensors in FIGS. 2 to 10.

Figure 2:
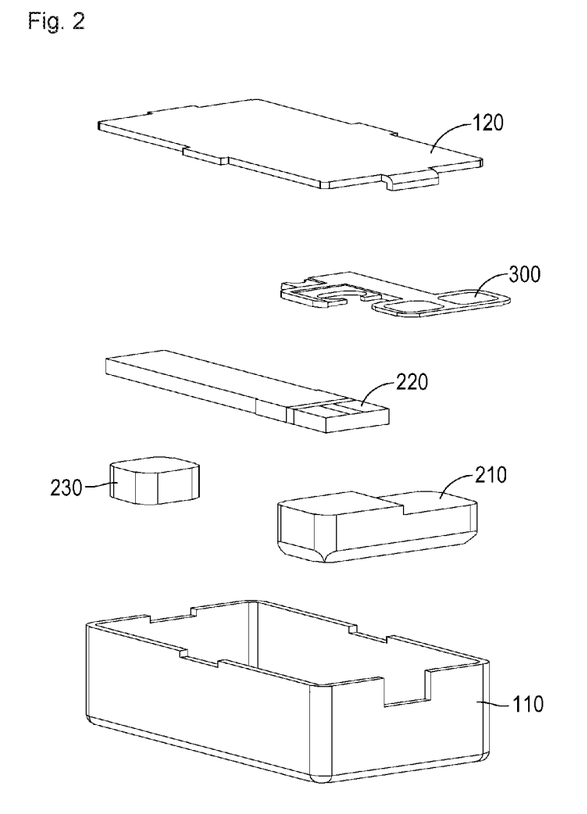
FIG. 2 is an exploded view of a sound vibration microphone using a piezoelectric element having a cantilever structure according to a first embodiment of the present disclosure.
Figure 3:
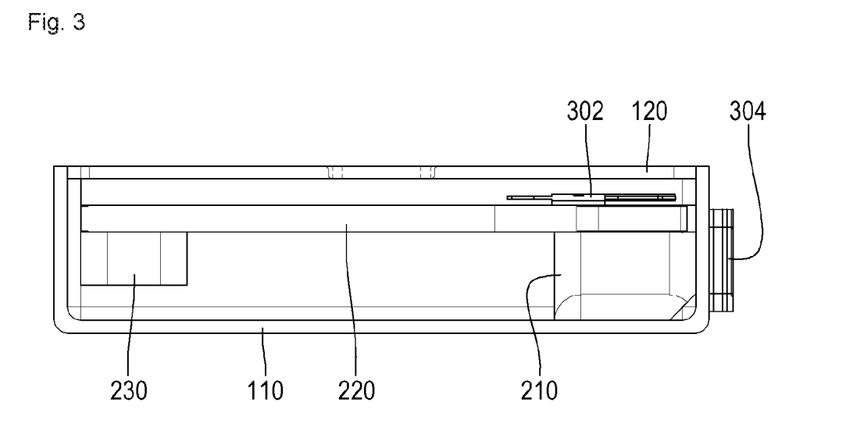
FIG. 3 is a cross-sectional view of a sound vibration microphone using a piezoelectric element having a cantilever structure according to the first embodiment of the present disclosure.

FIG. 2 is an exploded view of a sound vibration sensor using a piezoelectric element having a cantilever structure according to a first embodiment of the present disclosure, and FIG. 3 is a cross-sectional view of a sound vibration sensor using a piezoelectric element having a cantilever structure according to the first embodiment of the present disclosure.

In the sound vibration sensor using a piezoelectric element having a cantilever structure (hereinafter, referred to as a "sound vibration sensor") according to the first embodiment of the present disclosure, a housing including a lower housing 110 and an upper housing 120 forms an exterior and components for sensing vibrations are installed in the housing.

The lower housing 110 has a lower surface and side walls, having a box shape with an opened upper surface, and the upper housing 120 is coupled to the lower housing 110 to close the opened upper surface. A piezoelectric element 220 in the form of a strip having a length greater than a thickness or a width is installed in the lower housing 110. Here, one end of the piezoelectric element 220 is fixed and the other end thereof is a free end, having a cantilever structure. The piezoelectric element 220 is preferably formed of a PZT ceramic material.

A support structure 210 supporting the fixed end of the piezoelectric element 220 is provided in the lower housing 110. It is preferable that the fixed portion of the piezoelectric element 220 fixed by the support structure 210 is 40% or less of a total volume. This is because if the volume of the fixed portion of the piezoelectric element 220 increases, a vibration width of the free end is reduced to limit a detection range of sound vibration.

Meanwhile, a weight 230 is attached to the free end of the piezoelectric element 220. The weight 230 has the advantage of amplifying vibration of the piezoelectric element 220, thereby increasing the detection range of sound vibration of the sound vibration sensor. Here, the weight 230 is preferably 5 mg or greater in weight. If the weight is smaller, the vibration amplification effect of the weight 230 decreases, and thus the weight is preferably 5 mg or greater in weight in order to increase detection efficiency of the piezoelectric element 220 and minimize noise. Meanwhile, it is preferable that the weight 230 is formed of metals having a density of 5 or greater that may reduce the volume and increase the weight. Here, the weight 230 may have any shape as long as the weight 230 is attached to the piezoelectric element 220, without limiting vibration of the piezoelectric element 220. For example, the weight 230 may have any shape such as a cylinder shape, a cap shape surrounding the free end of the piezoelectric element 220, a rectangular parallelepiped or a regular cube. The weight 230 may be attached to the piezoelectric element 220 by an adhesive member such as a bond or tape.

Meanwhile, an energizing part (or a conductive part) 300 capable of transmitting an output of the piezoelectric element 220 is connected to the fixed end side of the piezoelectric element 220. One end 302 of the energizing part 300 is connected to the piezoelectric element 220 within the housings 110 and 120 and the other end 304 of the energizing part 300 is drawn out of the housings 110 and 120 to form a contact point with the outside.

The sound vibration sensor detects vibration generated by a speaker's voice transmitted through the housings 110 and 120 using piezoelectric characteristics of the piezoelectric element 220. The piezoelectric element 220 is installed in a cantilever structure and vibrations of the housings 110 and 120 are amplified at the free end, and thus the piezoelectric element 220 may sensitively detect sound vibration. In addition, since it is attached to the speaker's body and detects vibration generated when a voice is spoken, external noise cannot be detected by a sensor. Therefore, if the sound vibration sensor is used as a microphone, external noise may be fundamentally blocked.

Figure 4:
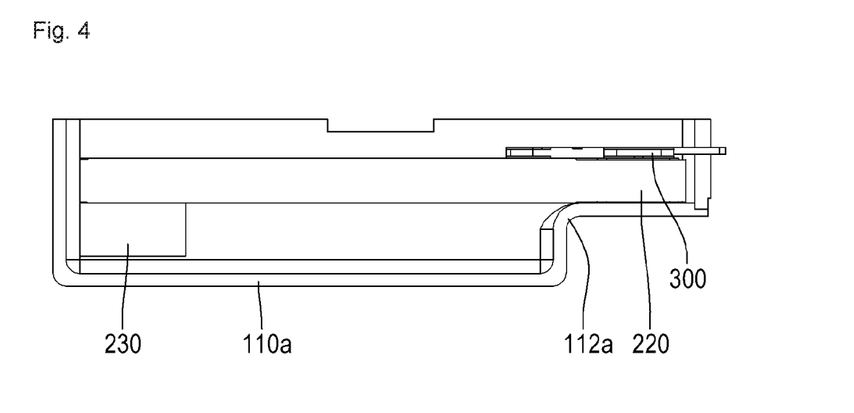
FIG. 4 is a cross-sectional view of a sound vibration microphone using a piezoelectric element having a cantilever structure according to a second embodiment of the present disclosure.

FIG. 4 is a cross-sectional view of a sound vibration sensor using a piezoelectric element having a cantilever structure according to a second embodiment of the present disclosure.

The sound vibration sensor according to the second embodiment of the present disclosure also includes the housing, the piezoelectric element 220, a weight 230, and the energizing part 300. However, the support structure for supporting a fixed end of the piezoelectric element 220 is not separately attached to the lower housing 110a. Instead, a portion of the lower housing 110a is bent inward to form a support structure 112a capable of supporting the piezoelectric element 220.

Figure 5:
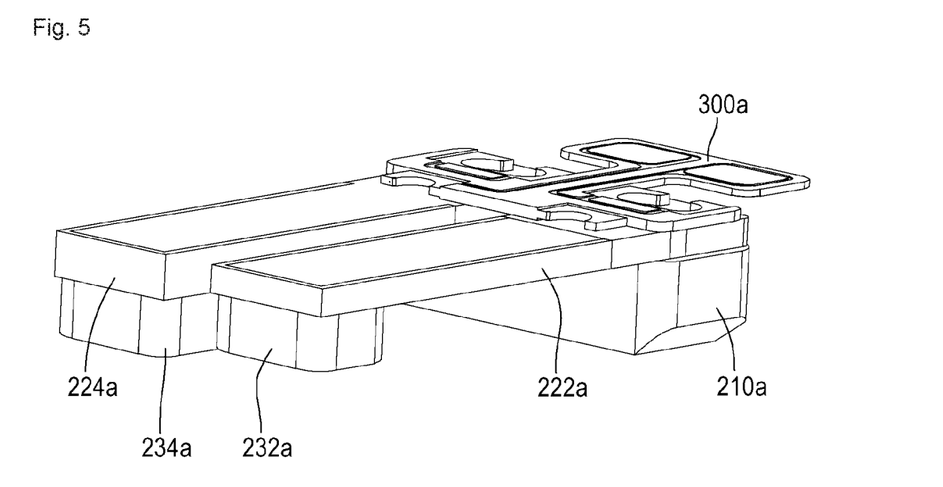
FIG. 5 is a view showing components other than a housing of a sound vibration microphone using a piezoelectric element having a cantilever structure according to a third embodiment of the present disclosure.

FIG. 5 is a view showing components excluding a housing of a sound vibration sensor using a piezoelectric element having a cantilever structure according to a third embodiment of the present disclosure.

A sound vibration sensor according to the third embodiment of the present disclosure is different from the previous embodiments in that it includes two piezoelectric elements 222a and 224a. In the third embodiment of the present disclosure, two piezoelectric elements 222a and 224a are provided, but three or more may also be provided. When a plurality of piezoelectric elements 222a and 224a are provided, there is an advantage in that a detection range for detecting voice vibration is increased. In this case, the piezoelectric elements 222a and 224a may have different thicknesses, thereby increasing accuracy of voice vibration detection. By varying the thickness of the piezoelectric elements 222a and 224a, not only amplitudes of free ends of the piezoelectric elements 222a and 224a are changed but also the piezoelectric characteristics are different, and thus accuracy of voice sensing may be increased by combining signals generated at the piezoelectric elements 222a and 224a.

Here, when the thicknesses of the piezoelectric elements 222a and 224a are different from each other, upper surfaces of the piezoelectric elements 222a and 224a may have the same height, i.e., may be coplanar, by varying heights of portions supporting the piezoelectric elements 222a and 224a in the support structure 300a. The energizing part 300 may be easily attached by arranging the upper surfaces of the piezoelectric elements 222a and 224a to be coplanar.

Figure 6:
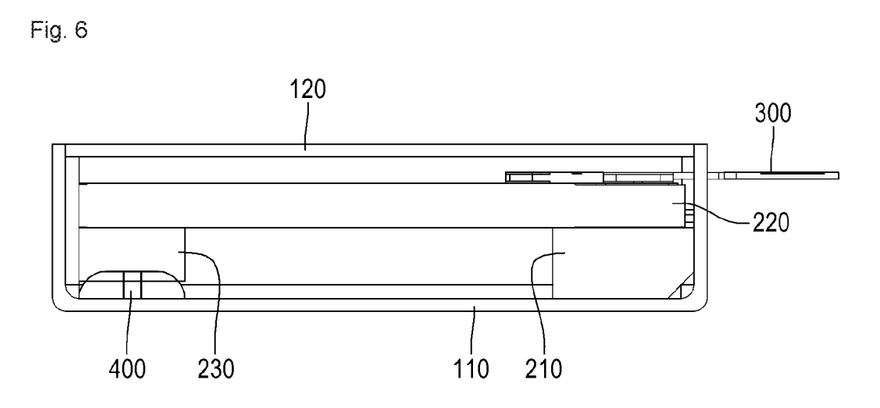
FIG. 6 is a cross-sectional view of a sound vibration microphone using a piezoelectric element having a cantilever structure according to a fourth embodiment of the present disclosure.
Figure 7:
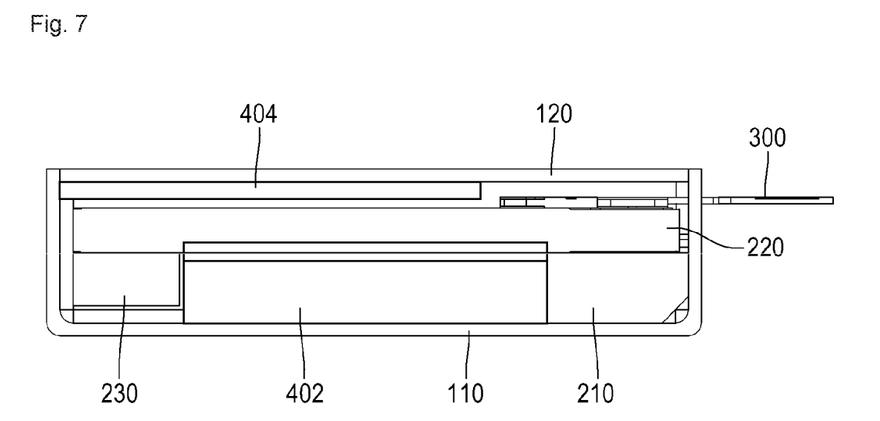
FIG. 7 is a cross-sectional view of a sound vibration microphone using a piezoelectric element having a cantilever structure according to a fifth embodiment of the present disclosure.

FIG. 6 is a cross-sectional view of a sound vibration sensor using a piezoelectric element having a cantilever structure according to a fourth embodiment of the present disclosure. FIG. 7 is a cross-sectional view of a sound vibration sensor using a piezoelectric element having a cantilever structure according to a fifth embodiment of the present disclosure. The sound vibration sensor according to the fourth embodiment of the present disclosure and the sound vibration sensor according to the fifth embodiment of the present disclosure have a damping structure for preventing damage to the piezoelectric element 220. In the fourth embodiment of the present disclosure, a damping bond 400 is applied on the lower housing 110 at a position close to the weight 230. In the fifth embodiment of the present disclosure, porons 402 and 404 are attached to the lower housing 110 and the upper housing 120. The porons 402 and 404 are appropriately disposed in empty spaces in the housings 110 and 120 and prevent impact from being applied to the piezoelectric element 220 due to a fall or the like.

Figure 8:
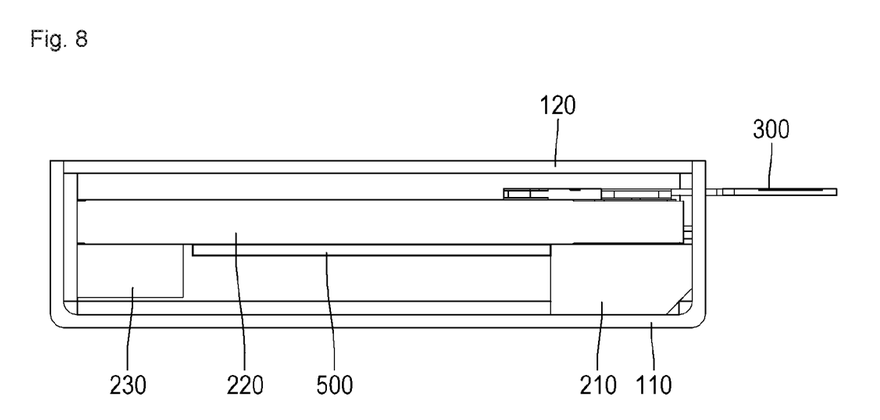
FIG. 8 is a cross-sectional view of a sound vibration microphone using a piezoelectric element having a cantilever structure according to a sixth embodiment of the present disclosure.

FIG. 8 is a cross-sectional view of a sound vibration sensor using a piezoelectric element having a cantilever structure according to a sixth embodiment of the present disclosure. The sound vibration sensor according to the sixth embodiment of the present disclosure includes a reinforcing plate 500 attached to the piezoelectric element 220 in order to prevent damage to the piezoelectric element 220. The reinforcing plate 500 does not serve to damp but may prevent the piezoelectric element 220 from being damaged.

Figure 9:
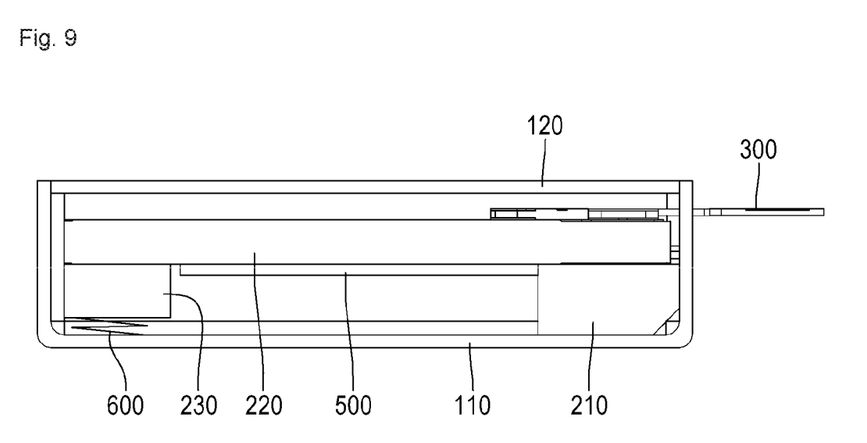
FIG. 9 is a cross-sectional view of a sound vibration microphone using a piezoelectric element having a cantilever structure according to a seventh embodiment of the present disclosure.

FIG. 9 is a cross-sectional view of a sound vibration sensor using a piezoelectric element having a cantilever structure according to a seventh embodiment of the present disclosure. The sound vibration sensor according to the seventh embodiment of the present disclosure includes the reinforcing plate 500 attached to the piezoelectric element 220 to prevent damage to the piezoelectric element 220 as in the sixth embodiment. In addition, an elastic member 600 is provided between the free end of the piezoelectric element 220 and the housing. The elastic member 600 serves to damp vibration of the free end. In the seventh embodiment of the present disclosure, the elastic member 600 is installed between the weight 230 attached to a lower portion of the free end of the piezoelectric element 220 and the lower housing 110. However, the installation position of the weight 230 and the elastic member 600 may be changed as necessary.

Figure 10:
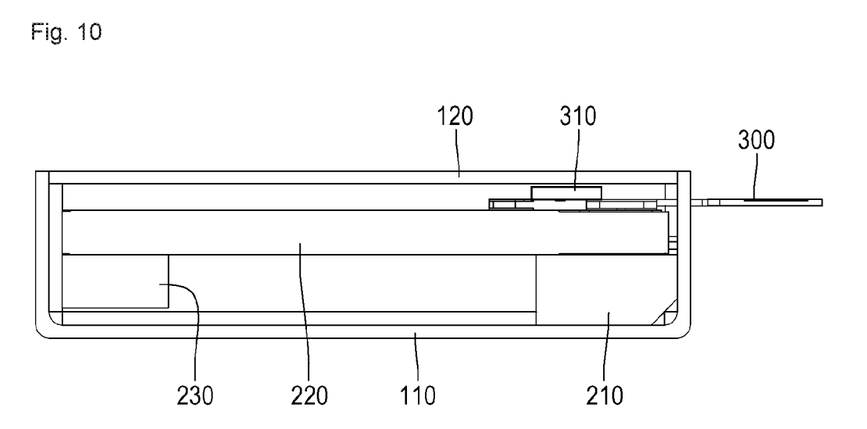
FIG. 10 is a cross-sectional view of a sound vibration microphone using a piezoelectric element having a cantilever structure according to an eighth embodiment of the present disclosure.

FIG. 10 is a cross-sectional view of a sound vibration sensor using a piezoelectric element having a cantilever structure according to an eighth embodiment of the present disclosure. Similar to the previous embodiments, the sound vibration sensor according to the eighth embodiment of the present disclosure includes the housings 110 and 120, the support structure 210, the piezoelectric element 220, the weight 230, and the energizing part 300. Here, an amplifier 310 for amplifying a signal of the piezoelectric element 220 may be provided on the energizing part 300.

As described above, the present invention is not limited to the above-described examples and various modifications may be made by a person skilled in the art to which the present invention pertains, without departing from the spirit of the invention as defined by the claims of the present invention, and such modifications also fall within the claims.

What is claimed is:

1. A translation system using a sound vibration microphone, the translation system comprising:
a first earset including a sound vibration sensor and a speaker;
a first wearable acoustic device including a microphone and a speaker and configured to perform wireless communication with the first earset; and
a first electronic communication device configured to perform wireless communication with the first wearable acoustic device and perform communication with a translation server,
wherein the first wearable acoustic device and the first electronic communication device are in a communicatable state,
wherein the first wearable acoustic device is configured to transmit a first sound signal from the first earset to the first electronic communication device with translation function, the first electronic communication device is configured to transmit the first sound signal to the translation server, receive a first translation signal corresponding to the first sound signal from the translation server, and transmit the first translation signal to the first wearable acoustic device, and the first wearable acoustic device is configured to emit the first translation signal as a sound through the speaker of the first wearable acoustic device, wherein the first wearable acoustic device is configured to transmit a second sound signal from the microphone thereof to the electronic communication device, the electronic communication device is configured to transmit the second sound signal to the translation server, receive a second translation signal corresponding to the second sound signal from the translation server, and transmit the second translation signal to the first wearable acoustic device, the first wearable acoustic device is configured to transmit the second translation signal to the first earset, and the first earset is configured to emit the second translation signal as a sound through the speaker thereof.

2. The translation system of claim 1, wherein:

the sound vibration sensor comprises a housing forming an exterior, a piezoelectric element installed in the housing and having a cantilever structure, a support structure supporting a fixed end of the piezoelectric element, a weight attached to a free end of the piezoelectric element, and an energizing part configured to transfer an output from the piezoelectric element; and a fixed portion of the piezoelectric element fixed by the support structure is 40% or less of a total volume, a thickness of the piezoelectric element is 0.3 mm or greater, a weight of the weight is 5 mg or greater, and the weight is formed of metals having a density of 5 or greater.

3. A translation system using a sound vibration microphone, the translation system comprising:

a first earset including a sound vibration sensor and a speaker; and a first wearable acoustic device including a microphone and a speaker and configured to perform wireless communication with the first earset, wherein the first wearable acoustic device is configured to transmit a first sound signal from the first earset via wireless communication to an electronic communication device with translation function to a translation server, receive a first translation signal corresponding to the first sound signal from the translation server, and emit the first translation signal as a sound through the speaker of the first wearable acoustic device, wherein the first wearable acoustic device is configured to transmit a second sound signal from the microphone thereof to the translation server, receive a second translation signal corresponding to the second sound signal from the translation server, and transmit the second translation signal to the first earset, and the first earset is configured to emit the second translation signal through the speaker of the first wearable acoustic device.

4. The translation system of claim 3, wherein:

the sound vibration sensor comprises a housing forming an exterior, a piezoelectric element installed in the housing and having a cantilever structure, a support structure supporting a fixed end of the piezoelectric element, a weight attached to a free end of the piezoelectric element, and an energizing part configured to transfer an output from the piezoelectric element; and a fixed portion of the piezoelectric element fixed by the support structure is 40% or less of a total volume, a thickness of the piezoelectric element is 0.3 mm or greater, a weight of the weight is 5 mg or greater, and the weight is formed of metals having a density of 5 or greater.

5. A translation system using a sound vibration microphone, the translation system comprising:

a first earset including a sound vibration sensor and a speaker;

a first wearable acoustic device including a microphone and a speaker and configured to perform wireless communication with the first earset; and a first electronic communication device including a microphone and a speaker, and configured to perform wireless communication with the first wearable acoustic device and perform communication with a translation server, wherein the first wearable acoustic device and the first electronic communication device are in a communicatable state, wherein the first wearable acoustic device is configured to transmit a first sound signal from the first earset to an electronic communication device with translation function, the first electronic communication device is configured to transmit the first sound signal to the translation server, receive a first translation signal corresponding to the first sound signal from the translation server, and emit the first translation signal as a sound through the speaker of the first wearable acoustic device, wherein the first electronic communication device is configured to transmit a second sound signal from the microphone thereof to the translation server, receive a second translation signal corresponding to the second sound signal from the translation server, and transmit the second translation signal to the first wearable acoustic device, the first wearable acoustic device is configured to transmit the second translation signal to the first earset, and the first earset is configured to emit the second translation signal as a sound through the speaker of the first wearable acoustic device.

6. The translation system of claim 5, wherein:

the sound vibration sensor comprises a housing forming an exterior, a piezoelectric element installed in the housing and having a cantilever structure, a support structure supporting a fixed end of the piezoelectric element, a weight attached to a free end of the piezoelectric element, and an energizing part configured to transfer an output from the piezoelectric element; and a fixed portion of the piezoelectric element fixed by the support structure is 40% or less of a total volume, a thickness of the piezoelectric element is 0.3 mm or greater, a weight of the weight is 5 mg or greater, and the weight is formed of metals having a density of 5 or greater.

7. A translation system using a sound vibration microphone, the translation system comprising:

first and second earsets including a sound vibration sensor and a speaker;

a first wearable acoustic device configured to perform wireless communication with the first and second earsets; and a first electronic communication device configured to perform wireless communication with the first wearable acoustic device and perform communication with a translation server, wherein the first wearable acoustic device and the first electronic communication device are in a communicatable state, the first wearable acoustic device is configured to transmit a first sound signal from the first earset to the first electronic communication device with translation function, the first electronic communication device is configured to transmit the first sound signal to a translation server, receive a first translation signal corresponding to the first sound signal from the translation server, and transmit the first translation signal to the first wearable acoustic device, the first wearable acoustic device is configured to transmit the first translation signal to the second earset, and the second earset is configured to emit the first translation signal as a sound through the speaker the first wearable acoustic device, wherein the first wearable acoustic device is configured to transmit a second sound signal from the second earset to the electronic communication device, the first electronic communication device is configured to transmit the second sound signal to the translation server, receive a second translation signal corresponding to the second sound signal from the translation server, and transmit the second translation signal to the first wearable acoustic device, the first wearable acoustic device is configured to transmit the second translation signal to the first earset, and the first earset is configured to emit the second translation signal as a sound through the speaker of the first wearable acoustic device.

8. The translation system of claim 7, wherein:

the sound vibration sensor comprises a housing forming an exterior, a piezoelectric element installed in the housing and having a cantilever structure, a support structure supporting a fixed end of the piezoelectric element, a weight attached to a free end of the piezoelectric element, and an energizing part configured to transfer an output from the piezoelectric element; and a fixed portion of the piezoelectric element fixed by the support structure is 40% or less of a total volume, a thickness of the piezoelectric element is 0.3 mm or greater, a weight of the weight is 5 mg or greater, and the weight is formed of metals having a density of 5 or greater.

9. A translation system using a sound vibration microphone, the translation system comprising:

a user translation apparatus including a first earset including a sound vibration sensor and a speaker, a first wearable acoustic device including a microphone and a speaker and configured to perform wireless communication with the first earset, and a first electronic communication device configured to perform wireless communication with the first wearable acoustic device and perform communication with a translation server; and a conversation counterpart translation apparatus including a second earset including a sound vibration sensor and a speaker, a second wearable acoustic device including a microphone and a speaker and configured to perform wireless communication with the second earset, and a second electronic communication device configured to perform wireless communication with the second wearable acoustic device and perform communication with the translation server, wherein the first wearable acoustic device is configured to transmit a first sound signal from the first earset to the first electronic communication device with translation function, the first electronic communication device is configured to transmit the first sound signal to the translation server, receive a first translation signal corresponding to the first sound signal from the translation server, and transmit the first translation signal to a second electronic communication device, the second electronic communication device is configured to transmit the first translation signal to the second wearable acoustic device, and the second wearable acoustic device is configured to transmit the first translation signal to the second earset to emit the first translation signal as a sound, wherein the second wearable acoustic device is configured to transmit a second sound signal from the second earset to the second electronic communication device, the second electronic communication device is configured to transmit the second sound signal to the translation server, receive a second translation signal corresponding to the second sound signal from the translation server, and transmit the second translation signal to the first electronic communication device, the first electronic communication device is configured to transmit the second translation signal to the first wearable acoustic device, and the first wearable acoustic device is configured to transmit the second translation signal to the first earset to emit the second translation signal as a sound.

10. The translation system of claim 9, wherein:

the sound vibration sensor comprises a housing forming an exterior, a piezoelectric element installed in the housing and having a cantilever structure, a support structure supporting a fixed end of the piezoelectric element, a weight attached to a free end of the piezoelectric element, and an energizing part configured to transfer an output from the piezoelectric element; and a fixed portion of the piezoelectric element fixed by the support structure is 40% or less of a total volume, a thickness of the piezoelectric element is 0.3 mm or greater, a weight of the weight is 5 mg or greater, and the weight is formed of metals having a density of 5 or greater.

* * * * *